(12) United States Patent
Morosawa et al.

(10) Patent No.: US 11,881,029 B2
(45) Date of Patent: Jan. 23, 2024

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Ryo Morosawa, Tokyo (JP); Haisong Liu, Tokyo (JP); Akira Nakajima, Tokyo (JP); Kenji Okuma, Tokyo (JP); Hiroaki Maruyama, Tokyo (JP); Yoshikazu Matsuo, Tokyo (JP); Shuto Higashi, Tokyo (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 434 days.

(21) Appl. No.: 17/329,472

(22) Filed: May 25, 2021

(65) Prior Publication Data

US 2021/0370882 A1 Dec. 2, 2021

(30) Foreign Application Priority Data

May 27, 2020 (JP) .................................. 2020-092475

(51) Int. Cl.
| | |
|---|---|
| *G06V 20/56* | (2022.01) |
| *G06V 20/58* | (2022.01) |
| *B60R 25/31* | (2013.01) |
| *B60R 25/01* | (2013.01) |
| *B60R 25/30* | (2013.01) |
| *B60R 25/20* | (2013.01) |
| *E05F 15/73* | (2015.01) |

(Continued)

(52) U.S. Cl.
CPC .............. *G06V 20/58* (2022.01); *B60R 25/01* (2013.01); *B60R 25/20* (2013.01); *B60R 25/305* (2013.01); *B60R 25/31* (2013.01); *E05B 81/64* (2013.01); *E05F 15/73* (2015.01); *G06F 18/22* (2023.01); *G06V 10/74* (2022.01); *G06V 20/56* (2022.01); *G06V 20/59* (2022.01); *G06V 40/10* (2022.01); *G06V 40/20* (2022.01); *E05F 2015/767* (2015.01); *E05Y 2400/45* (2013.01); *E05Y 2400/85* (2013.01); *E05Y 2900/531* (2013.01)

(58) Field of Classification Search
CPC ........ G06V 20/58; G06V 20/59; G06V 10/74; G06V 40/10; G06V 40/20; G06V 20/56; E05F 15/73; E05F 2015/767; G06F 18/22; B60R 25/01; B60R 25/20; B60R 25/305; B60R 25/31; E05B 81/64; E05Y 2400/45; E05Y 2400/85; E05Y 2900/531

See application file for complete search history.

(56) References Cited

FOREIGN PATENT DOCUMENTS

JP 2003-138817 5/2003

*Primary Examiner* — Mathew Franklin Gordon
(74) *Attorney, Agent, or Firm* — Rankin, Hill & Clark LLP

(57) ABSTRACT

A vehicle control system includes: a service arrangement information acquisition unit which acquires service arrangement information including identification information of at least either one of a person in charge of a service who executes a predetermined service that targets a predetermined vehicle and a service vehicle used when executing the predetermined service; a surrounding object recognition unit which recognizes an object present in an area around the predetermined vehicle; and a service reception handling unit which executes predetermined processing for receiving the predetermined service in a case where the object is determined as the service vehicle or the person in charge of the service by an object authentication unit.

10 Claims, 5 Drawing Sheets

(51) Int. Cl.
*E05B 81/64* (2014.01)
*G06V 20/59* (2022.01)
*G06V 40/10* (2022.01)
*G06F 18/22* (2023.01)
*G06V 10/74* (2022.01)
*G06V 40/20* (2022.01)

VEHICLE CONTROL SYSTEM, VEHICLE CONTROL METHOD, AND STORAGE MEDIUM

INCORPORATION BY REFERENCE

The present application claims priority under 35 U.S.C. § 119 to Japanese Patent Application No. 2020-092475 filed on May 27, 2020. The content of the application is incorporated herein by reference in its entirety.

BACKGROUND OF THE INVENTION

Field of the Invention

The present invention relates to a vehicle control system, a vehicle control method, and a storage medium.

Description of the Related Art

Conventionally, an entry system which performs individual authentication of an object approaching a vehicle by a photographed image of vehicle surroundings by a camera and permits entry to the vehicle is known (for example, see Japanese Patent Laid-Open No. 2003-138817). The entry system identifies whether or not the object is a user according to coincidence between iris data of the object recognized from an image of the object approaching the vehicle and iris data of the user registered beforehand.

While various services that target a vehicle have been provided such as substitute driving of a vehicle or delivery of articles to a parked vehicle, also in such services, it is expected to efficiently execute the service by performing processing of recognizing a person in charge of the service or a service vehicle approaching the vehicle like the entry system described above.

The present invention is implemented in consideration of such a background, and an object is to provide a vehicle control system, a vehicle control method, and a storage medium storing a control program capable of supporting efficient execution of a service that targets a vehicle.

SUMMARY OF THE INVENTION

A first aspect for achieving the above-described object is a vehicle control system including: a service arrangement information acquisition unit configured to acquire service arrangement information including identification information of at least either one of a person in charge of a service who executes a predetermined service that targets a predetermined vehicle and a service vehicle used when executing the predetermined service; a surrounding object recognition unit configured to recognize an object located in an area around the predetermined vehicle; an object authentication unit configured to determine whether or not the object is the person in charge of the service or the service vehicle based on the identification information; and a service reception handling unit configured to execute predetermined processing for receiving the predetermined service in a case where the object is determined as the person in charge of the service or the service vehicle by the object authentication unit.

The above-described vehicle control system may be configured such that the surrounding object recognition unit recognizes the object by extracting an image portion satisfying a predetermined extraction condition from a surrounding image of the predetermined vehicle photographed by a camera provided on the predetermined vehicle, the identification information is an image of the person in charge of the service or the service vehicle, and the object authentication unit determines whether or not the object is the person in charge of the service or the service vehicle based on a matching degree between the image portion and the image of the person in charge of the service or the service vehicle.

The above-described vehicle control system may be configured such that the service reception handling unit executes first reporting to a user of the predetermined vehicle as the predetermined processing.

The above-described vehicle control system may be configured such that the vehicle control system includes a user state recognition unit configured to recognize a state of the user riding on the predetermined vehicle, and the service reception handling unit executes second reporting different from the first reporting to the user in the case where reaction of the user according to the first reporting is not recognized by the user state recognition unit.

The above-described vehicle control system may be configured such that the service arrangement information includes identification information of the person in charge of the service and the service vehicle, and the service reception handling unit executes processing of unlocking a door lock of the predetermined vehicle as the predetermined processing in the case where a first object is determined as the service vehicle and a second object is determined as the person in charge of the service by the object authentication unit.

The above-described vehicle control system may be configured such that the service arrangement information includes identification information of the person in charge of the service and the service vehicle, and the service reception handling unit executes third reporting to a user of the predetermined vehicle in the case where a third object is determined as the service vehicle by the object authentication unit and a fourth object determined as the person in charge of the service by the object authentication unit is not located.

The above-described vehicle control system may be configured such that the service reception handling unit executes processing of turning the predetermined vehicle to an immovable state as the predetermined processing.

The above-described vehicle control system may be configured such that the service reception handling unit executes processing of opening a power door provided in the predetermined vehicle as the predetermined processing.

A second aspect for achieving the above-described object is a vehicle control method executed by a computer, and the vehicle control method includes: a service arrangement information acquisition step of acquiring service arrangement information including identification information of at least either one of a person in charge of a service who executes a predetermined service that targets a predetermined vehicle and a service vehicle used when executing the predetermined service; a surrounding object recognition step of recognizing an object located in an area around the predetermined vehicle; an object authentication step of determining whether or not the object is the person in charge of the service or the service vehicle based on the identification information; and a service reception handling step of executing predetermined processing for receiving the predetermined service in a case where the object is determined as the person in charge of the service or the service vehicle by the object authentication step.

A third aspect for achieving the above-described object is a non-transitory computer-readable storage medium storing a control program which is executed by a processor of a vehicle control system to control a vehicle, wherein the control program makes the processor functions as: a service arrangement information acquisition unit configured to acquire service arrangement information including identification information of at least either one of a person in charge of a service who executes a predetermined service that targets a predetermined vehicle and a service vehicle used when executing the predetermined service; a surrounding object recognition unit configured to recognize an object located in an area around the predetermined vehicle; an object authentication unit configured to determine whether or not the object is the person in charge of the service or the service vehicle based on the identification information; and a service reception handling unit configured to execute predetermined processing for receiving the predetermined service in a case where the object is determined as the person in charge of the service or the service vehicle by the object authentication unit.

According to the above-described vehicle control system, in the case where an object located in an area around a predetermined vehicle which is a target of a predetermined service is determined by an object authentication unit as a person in charge of the service or a service vehicle, the identification information of which is included in service arrangement information, predetermined processing for receiving the predetermined service is executed by a service reception handling unit. Thus, efficient execution of the service that targets the vehicle can be supported.

DETAILED DESCRIPTION OF THE PREFERRED EMBODIMENTS

1. Support Aspect of Substitute Driving Service by Vehicle Control System

Figure 1:
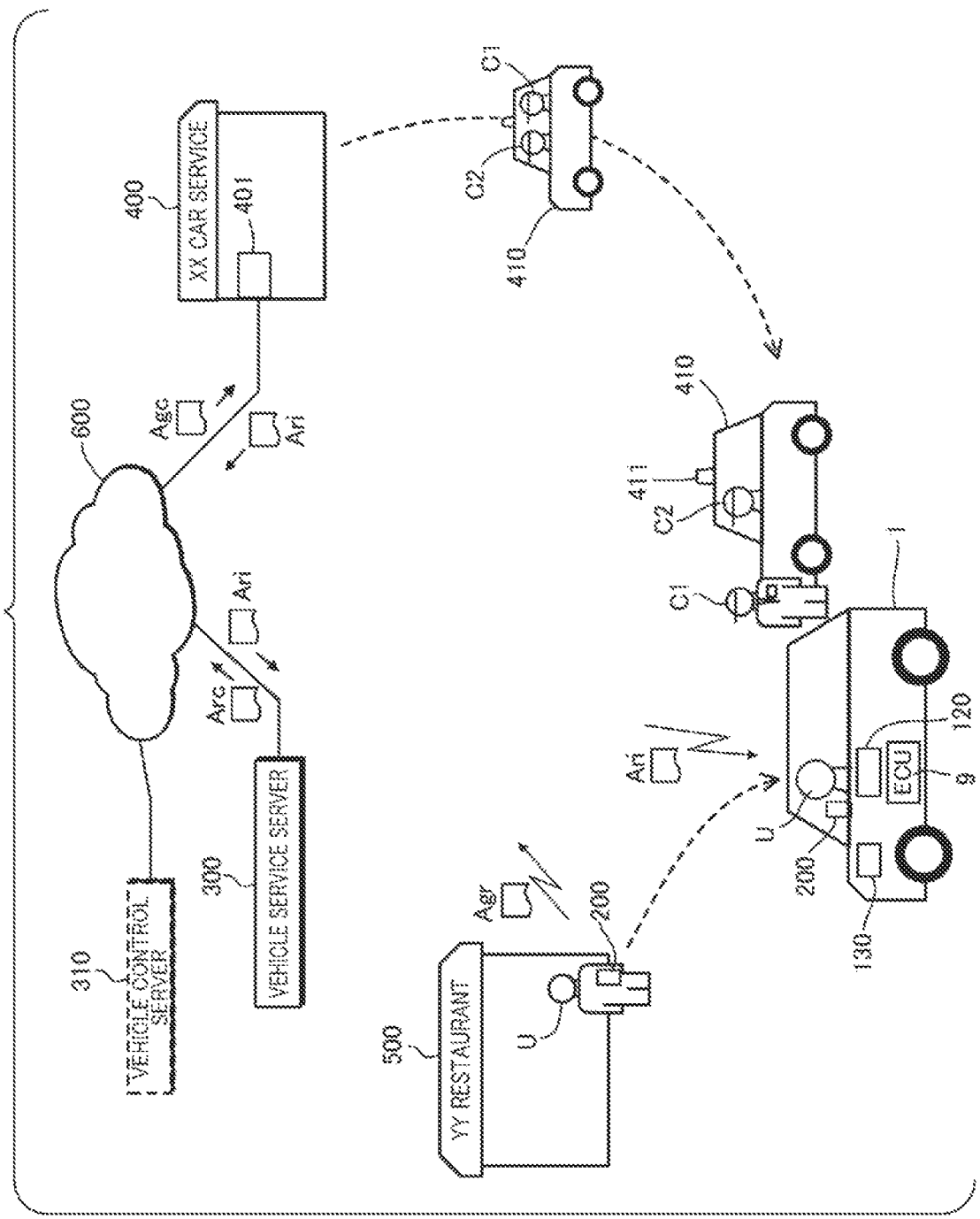
FIG. 1 is an explanatory drawing of a support aspect of a substitute driving service by a vehicle control system.

With reference to FIG. 1, an outline of the substitute driving service which is an example of a service that targets a vehicle, and processing of supporting reception of the substitute driving service, which is executed by an ECU (Electronic Control Unit) 9 loaded on a predetermined vehicle 1 which is a target of a substitute driving service, will be explained. The ECU 9 includes a function of the vehicle control system of the present invention.

In FIG. 1, the predetermined vehicle 1 is a target vehicle of the substitute driving service, a request for the substitute driving service is received by a vehicle service server 300, and the substitute driving service is arranged by a vehicle service provider 400. The vehicle service server 300 and a management system 401 of the vehicle service provider 400 communicate via a communication network 600. The vehicle service server 300 includes a processor and an antenna.

In addition, a user terminal 200 (such as a smartphone or a cellular phone) used by a user U of the vehicle 1 and a communication unit 120 loaded on the predetermined vehicle 1 communicates with the vehicle service server 300 via a communication network. The communication unit 120 (transmitter/receiver) includes an antenna. Note that the vehicle control system may be configured not by the ECU 9 but by a vehicle control server 310 which includes a processor and an antenna and which communicates with the predetermined vehicle 1. The aspect of configuring the vehicle control system by the vehicle control server 310 will be described later.

FIG. 1 illustrates a situation where the user U who has visited a restaurant 500 on the predetermined vehicle 1 requests the substitute driving service by operating a substitute driving application (application program) installed in the user terminal 200 when going home after eating and drinking. The substitute driving application transmits substitute request information Agr indicating request content of substitute driving specified by the user U to the vehicle service server 300. The substitute request information Agr includes information (such as a name and a telephone number) of the user U, information (such as a vehicle model and a vehicle body color) of the predetermined vehicle 1, an execution route (a departure spot to a destination spot) of the substitute driving, and a utilization charge of the substitute driving or the like.

A plurality of vehicle service providers including the vehicle service provider 400 are registered in the vehicle service server 300, and the vehicle service server 300 selects an appropriate vehicle service provider according to the substitute request information Agr. FIG. 1 illustrates the case where the vehicle service server 300 selects the vehicle service provider 400.

The vehicle service server 300 transmits substitute instruction information Arc indicating the request content of the substitute driving service to the management system 401 of the vehicle service provider 400, and instructs to arrange the substitute driving of the predetermined vehicle 1. The substitute instruction information Arc includes the request content of the substitute driving according to the substitute request information Agr.

The vehicle service provider 400 arranges a service vehicle 410 and persons C1 and C2 in charge of the service according to the request content of the substitute driving instructed by the substitute instruction information Arc. The persons C1 and C2 in charge of the service ride on the service vehicle 410 and head to a parking place (such as a parking lot of the restaurant 500) of the predetermined vehicle 1.

In addition, the vehicle service provider 400 transmits substitute arrangement information Ari including identification information of the service vehicle 410 and the persons C1 and C2 in charge of the service that are arranged from the management system 401 to the vehicle service server 300. The vehicle service server 300 transmits the substitute arrangement information Ari received from the management system 401 to the predetermined vehicle 1. The substitute arrangement information Ari corresponds to service arrangement information of the present invention.

Note that the substitute driving may be directly requested to the vehicle service provider 400 without interposing the vehicle service server 300. In this case, the substitute request information Agr is transmitted from the user terminal 200 to the management system 401 of the vehicle service provider 400. Further, the substitute arrangement information Ari is transmitted from the management system 401 to the predetermined vehicle 1.

As the identification information of the service vehicle 410, for example, an image of the service vehicle 410, an image of a company name display lamp 411 attached to a roof of the service vehicle 410, and a vehicle model and a color of the service vehicle 410 or the like are adopted. In addition, as the identification information of the persons C1 and C2 in charge of the service, face images, physiques and uniform features or the like of the persons C1 and C2 in charge of the service are adopted.

After ending eating and drinking at the restaurant 500, the user U who has reserved the substitute driving service returns to the predetermined vehicle 1 and waits. The ECU 9 recognizes an object located in an area around the predetermined vehicle 1 based on photographed images of vehicle exterior cameras (see FIG. 2 to be described later) equipped on the predetermined vehicle 1. Then, the ECU 9 recognizes arrival of the service vehicle 410 and the persons C1 and C2 in charge of the service by recognizing the object having a feature that matches with the identification information of the service vehicle 410 extracted from the substitute arrangement information Ari and the object having the feature that matches with the identification information of the persons C1 and C2 in charge of the service extracted from the substitute arrangement information Ari.

Note that the ECU 9 may recognize both of the persons C1 and C2 in charge of the service, or may recognize at least either one of the persons C1 and C2 in charge of the service. When the arrival of the service vehicle 410 and the persons C1 and C2 in charge of the service is recognized, the ECU 9 executes predetermined processing for receiving the substitute driving service. In the present embodiment, the ECU 9 performs processing of turning the predetermined vehicle 1 to an immovable state, processing of reporting the arrival of the service vehicle 410 and the persons C1 and C2 in charge of the service to the user U, and processing of unlocking and opening a door of the predetermined vehicle 1, as the predetermined processing for receiving the substitute driving service.

By executing the predetermined processing, a state where the user U can receive the substitute driving service that targets the predetermined vehicle 1 is attained, and efficient execution of the substitute driving service by the persons C1 and C2 in charge of the service who have arrived can be supported. The person C1 in charge of the service rides on the predetermined vehicle 1, drives the vehicle 1, and heads to a destination such as a house of the user U together with the service vehicle 410 driven by the person C2 in charge of the service.

2. Configuration of Vehicle

Figure 2:
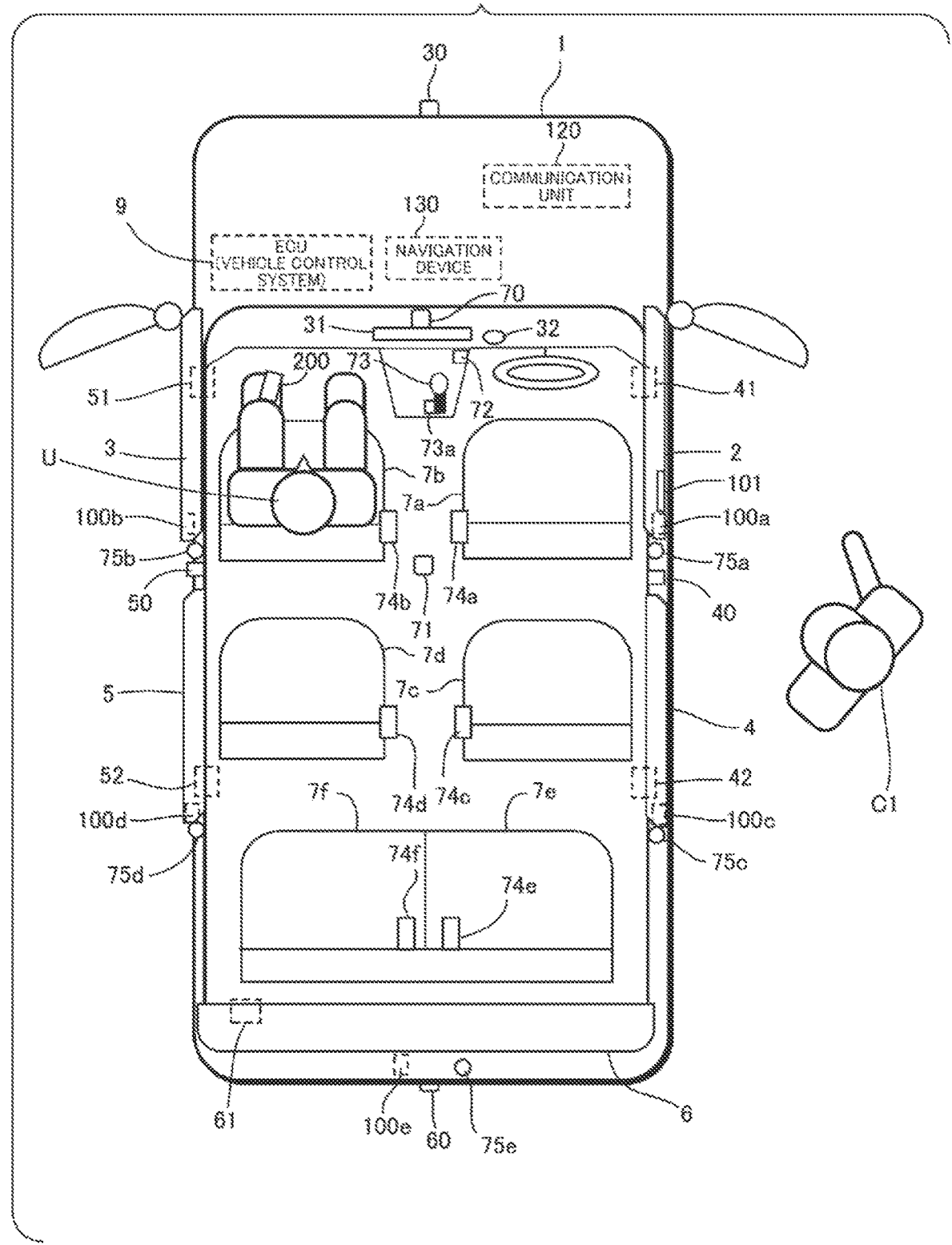
FIG. 2 is a block diagram of a vehicle loaded with the vehicle control system.

With reference to FIG. 2, the configuration of the predetermined vehicle 1 loaded with the ECU 9 including the function of the vehicle control system will be explained. The predetermined vehicle 1 is a passenger car with a riding capacity of six people, and includes a driver's seat 7a, a passenger seat 7b, a second row right seat 7c, a second row left seat 7d, a third row right seat 7e, and a third row left seat 7f. The individual seats 7a-7f are provided with seatbelt switches 74a-74f which detect whether or not non-illustrated seatbelts are worn. Hereinafter, the second row right seat 7c and the second row left seat 7d are also referred to as second row seats together, and the third row right seat 7e and the third row left seat 7f are also referred to as third row seats together. The user U is sitting in the passenger seat 7b and is waiting for the arrival of the service vehicle 410.

The predetermined vehicle 1 includes a right power hinge door 2, a left power hinge door 3, a right power slide door 4, a left power slide door 5, and a power tail gate 6. Hereinafter, the right power hinge door 2, the left power hinge door 3, the right power slide door 4 and the left power slide door 5 are also referred to as power doors. The right power slide door 4 and the left power slide door 5 are the power doors corresponding to the second row seats and the third row seats.

A door knob of the right power hinge door 2 is provided with a door touch sensor 101, and the user U who has a portable key (not illustrated) of the predetermined vehicle 1 can unlock the doors 2-6 of the predetermined vehicle 1 by touching the door touch sensor 101.

The right power hinge door 2 includes a right PHD (Power Hinge Door) drive unit 41 which opens and closes the right power hinge door 2 by an electric actuator (not illustrated), and the left power hinge door 3 includes a left PHD drive unit 51 which opens and closes the left power hinge door 3 by the electric actuator. The right power slide door 4 includes a right PSD (Power Slide Door) drive unit 42 which opens and closes the right power slide door 4 by the electric actuator, and the left power slide door 5 includes a left PSD drive unit 52 which opens and closes the left power slide door 5 by the electric actuator. The power tail gate 6 includes a PTG (Power Tail Gate) drive unit 61 which opens and closes the power tail gate 6 by the electric actuator.

A front camera 30 which photographs front of the predetermined vehicle 1 is provided on a front part of the predetermined vehicle 1, and a rear camera 60 which photographs rear of the predetermined vehicle 1 is provided on a rear part of the predetermined vehicle 1. A right side camera 40 which photographs a right side of the predetermined vehicle 1 is provided on a right side part of the predetermined vehicle 1, and a left side camera 50 which photographs a left side of the vehicle 1 is provided on a left side part of the predetermined vehicle 1.

On a dashboard of a vehicle interior, a front seat camera 70 which photographs users sitting in the driver's seat 7a and the passenger seat 7b, a display device 31 and a speaker 32 are provided. On a ceiling of the vehicle interior, rear seat camera 71 which photographs users sitting in the second row right seat 7c, the second row left seat 7d, the third row right seat 7e and the third row left seat 7f is provided.

The individual doors 2-5 are provided with door switches 75a-75d which detect opening/closing of the doors. The power tail gate 6 is also provided with a door switch 75e which detects the opening/closing of the power tail gate 6. Further, near the driver's seat 7a, a power switch 72 for instructing on/off of power of the predetermined vehicle 1, and a shift switch 73a which detects a shift position of a shift lever 73 are provided.

Further, the predetermined vehicle 1 includes door lock mechanisms 100a-100e which lock the individual doors 2-5 and the power tail gate 6, the communication unit 120 which communicates with the user terminal 200 and the vehicle service server 300 or the like, and a navigation device 130. The navigation device 130 has a non-illustrated processor, GPS (Global Positioning System) sensor, memory, and map data, and executes route guidance, by a function of the processor, to a destination or the like based on a position of the predetermined vehicle 1 detected by the GPS sensor and the map data.

3. Configuration of Vehicle Control System

Figure 3:
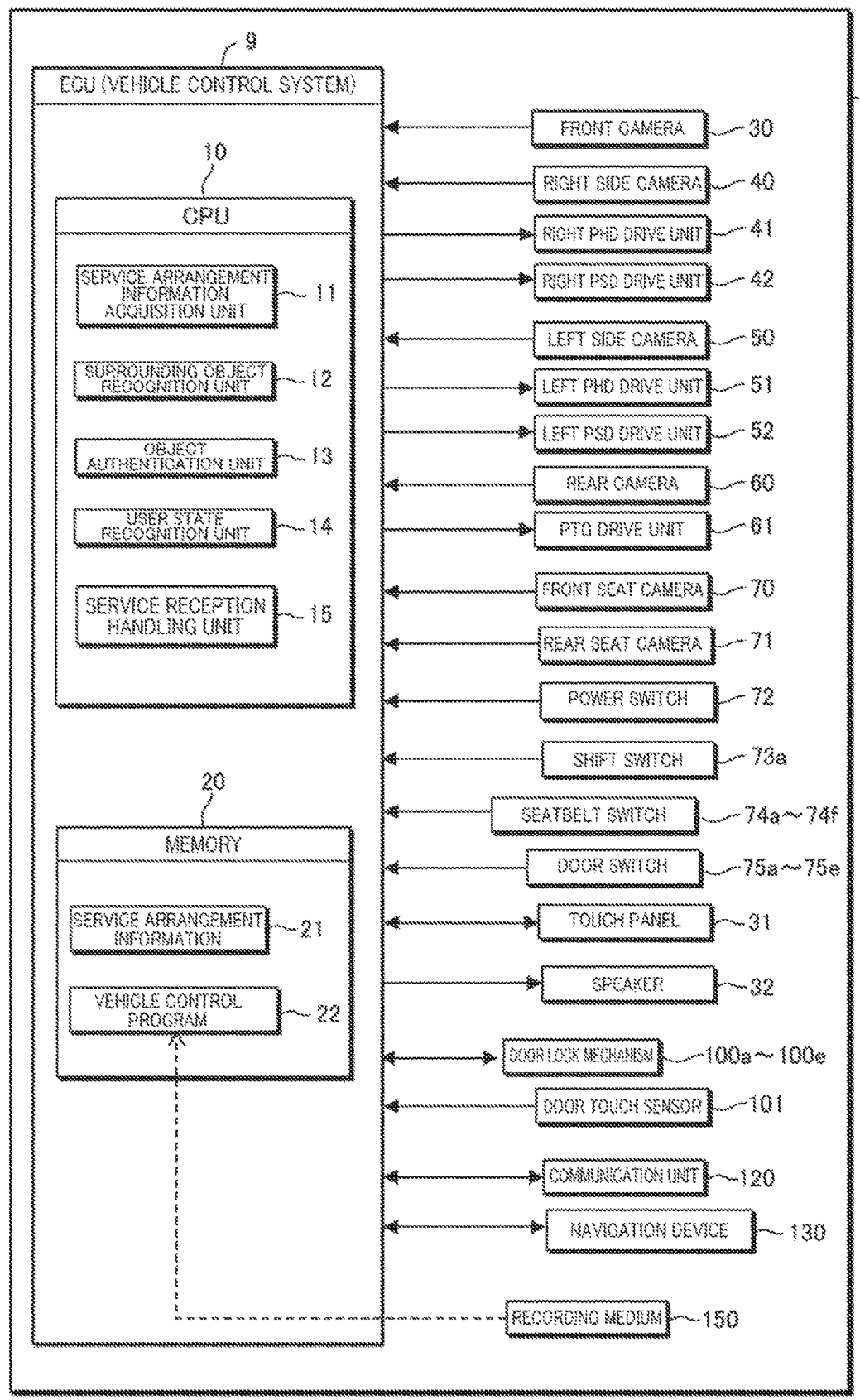
FIG. 3 is a block diagram of the vehicle control system.

With reference to FIG. 3, the vehicle control system configured as the function of the ECU 9 will be explained.

The ECU 9 is configured by a CPU (Central Processing Unit) 10, a memory 20 and a non-illustrated interface circuit or the like, and controls an operation of the predetermined vehicle 1. The CPU 10 corresponds to a computer of the present invention. In the memory 20, service arrangement information 21 in which the identification information of the service vehicle 410 and the persons C1 and C2 in charge of the service extracted from the substitute arrangement information Ari (see FIG. 1) is recorded, and a vehicle control program 22 are preserved.

The vehicle control program 22 may be read from a recording medium 150 (such as an optical disk or a flash memory) and preserved in the memory 20 by the ECU 9. In addition, the vehicle control program 22 may be downloaded from a non-illustrated external server via the communication network 600 and preserved in the memory 20 by the ECU 9.

To the ECU 9, images of surroundings of the predetermined vehicle 1 photographed by the front camera 30, the right side camera 40, the left side camera 50 and the rear camera 60 are inputted. In addition, to the ECU 9, the images inside the vehicle interior photographed by the front seat camera 70 and the rear seat camera 71 are inputted.

Further, to the ECU 9, detection signals of the power switch 72, the shift switch 73a, the seatbelt switches 74a-74f and the door switches 75a-75e, and lock detection signals of the individual doors 2-5 and the power tail gate 6 by door lock sensors (not illustrated) provided in the door lock mechanisms 100a-100e are inputted. In addition, to the ECU 9, an operation signal of the touch panel 31, a touch detection signal by the door touch sensor 101, and information on a current position of the predetermined vehicle 1 detected by the navigation device 130 are inputted.

By a control signal outputted from the ECU 9, the operations of the right PHD drive unit 41, the right PSD drive unit 42, the left PHD drive unit 51, the left PSD drive unit 52, the PTG drive unit 61 and the door lock mechanisms 100a-100e are controlled. In addition, by the control signal outputted from the ECU 9, screen display of the touch panel 31 and sound (such as voice guidance or chime sound) outputted from the speaker 32 are controlled. The ECU 9 communicates with the user terminal 200 carried by the user U and the vehicle service server 300 (see FIG. 1) or the like via the communication unit 120.

By reading and executing the vehicle control program 22 preserved in the memory 20, the CPU 10 functions as a service arrangement information acquisition unit 11, a surrounding object recognition unit 12, an object authentication unit 13, a user state recognition unit 14, and a service reception handling unit 15.

The processing executed by the service arrangement information acquisition unit 11 corresponds to a service arrangement information acquisition step in a vehicle control method of the present invention, and the processing executed by the surrounding object recognition unit 12 corresponds to a surrounding object recognition step in the vehicle control method of the present invention. The processing executed by the object authentication unit 13 corresponds to an object authentication step in the vehicle control method of the present invention, and the processing executed by the user state recognition unit 14 corresponds to a user state recognition step in the vehicle control method of the present invention. The processing executed by the service reception handling unit 15 corresponds to a service reception handling step in the vehicle control method of the present invention.

When the substitute arrangement information Ari (see FIG. 1) transmitted from the vehicle service server 300 is received, the service arrangement information acquisition unit 11 records the identification information of the service vehicle 410 and the identification information of the persons C1 and C2 in charge of the service or the like included in the substitute arrangement information Ari in the service arrangement information 21 preserved in the memory 20.

The identification information of the service vehicle 410 includes the image of the service vehicle 410, the image of the company name display lamp 411 attached to the roof of the service vehicle 410, and the vehicle model and the color of the service vehicle 410 or the like. The identification information of the persons C1 and C2 in charge of the service includes the face images, physiques and uniform features or the like of the persons C1 and C2 in charge of the service.

The surrounding object recognition unit 12 photographs the surroundings of the predetermined vehicle 1 by the front camera 30, the right side camera 40, the left side camera 50 and the rear camera 60 when the predetermined vehicle 1 is in a stop state. Then, the surrounding object recognition unit 12 recognizes the object located in an area around the predetermined vehicle 1 by extracting the image portion of a predetermined size or larger included in the photographed images. In the present embodiment, the objects recognized by the surrounding object recognition unit 12 include the service vehicle 410 and the persons C1 and C2 in charge of the service.

The object authentication unit 13 determines whether or not the object recognized by the surrounding object recognition unit 12 is the service vehicle 410 or the persons C1 and C2 in charge of the service based on the identification information of the service vehicle 410 and the identification information of the persons C1 and C2 in charge of the service.

The object authentication unit 13 calculates a matching rate between the image of the service vehicle 410 and the image of the object, a matching rate between the image of the company name display lamp 411 and the image of the object, a resembling degree between a shape of the image of the object and a shape of the vehicle model of the service vehicle 410, and an approximation degree between the color of the image of the object and the color of the service vehicle or the like. Then, in the case where the matching rates, the resembling degree and the approximation degree or the like are equal to or greater than a predetermined first determination threshold, the service reception handling unit 15 determines that the object is the service vehicle 410.

In addition, in the case where the matching rate between the face image of the person C1 in charge of the service and the image of the object, the resembling degree between the physique of the person C1 in charge of the service and the shape of the object, and the resembling degree between the feature of a uniform that the person C1 in charge of the service wears and an appearance of the object or the like are equal to or greater than a predetermined second determination threshold, the object authentication unit 13 determines that the object is the person C1 in charge of the service. Similarly, the object authentication unit 13 determines whether or not the object is the person C2 in charge of the service.

The user state recognition unit 14 photographs the vehicle interior of the predetermined vehicle 1 by the front seat camera 70 and the rear seat camera 71. Then, the user state recognition unit 14 extracts the image portion of the user U riding on the predetermined vehicle 1 from the photographed image of the front seat camera 70 or the rear seat camera 71, and recognizes the state of the user U. In the present embodiment, the user state recognition unit 14 recognizes a motion of the user U based on displacement of the image portion of the user U.

In the case where a first object recognized by the surrounding object recognition unit 12 is determined as the service vehicle and a second object recognized by the surrounding object recognition unit 12 is determined as the person C1 or C2 in charge of the service by the object authentication unit 13, the service reception handling unit 15 executes the predetermined processing for receiving the substitute driving service.

In the present embodiment, the service reception handling unit 15 performs the processing of turning the predetermined vehicle 1 to the immovable state, reporting to the vehicle interior of the predetermined vehicle 1, releasing of a door lock of the predetermined vehicle 1, and the processing of opening the power door of the predetermined vehicle 1, as the predetermined processing for receiving the substitute driving service. Thus, at timing at which the service vehicle 410 that the persons C1 and C2 in charge of the service are riding arrives near the predetermined vehicle 1, the state where the persons C1 and C2 in charge of the service can efficiently execute the substitute driving service can be attained.

4. Support Processing of Substitute Driving Service

With reference to FIGS. 1 to 3, according to flowcharts illustrated in FIGS. 4 to 5, the support processing of the substitute driving service executed by the service arrangement information acquisition unit 11, the surrounding object recognition unit 12, the user state recognition unit 14, and the service reception handling unit 15 will be explained.

Figure 4:
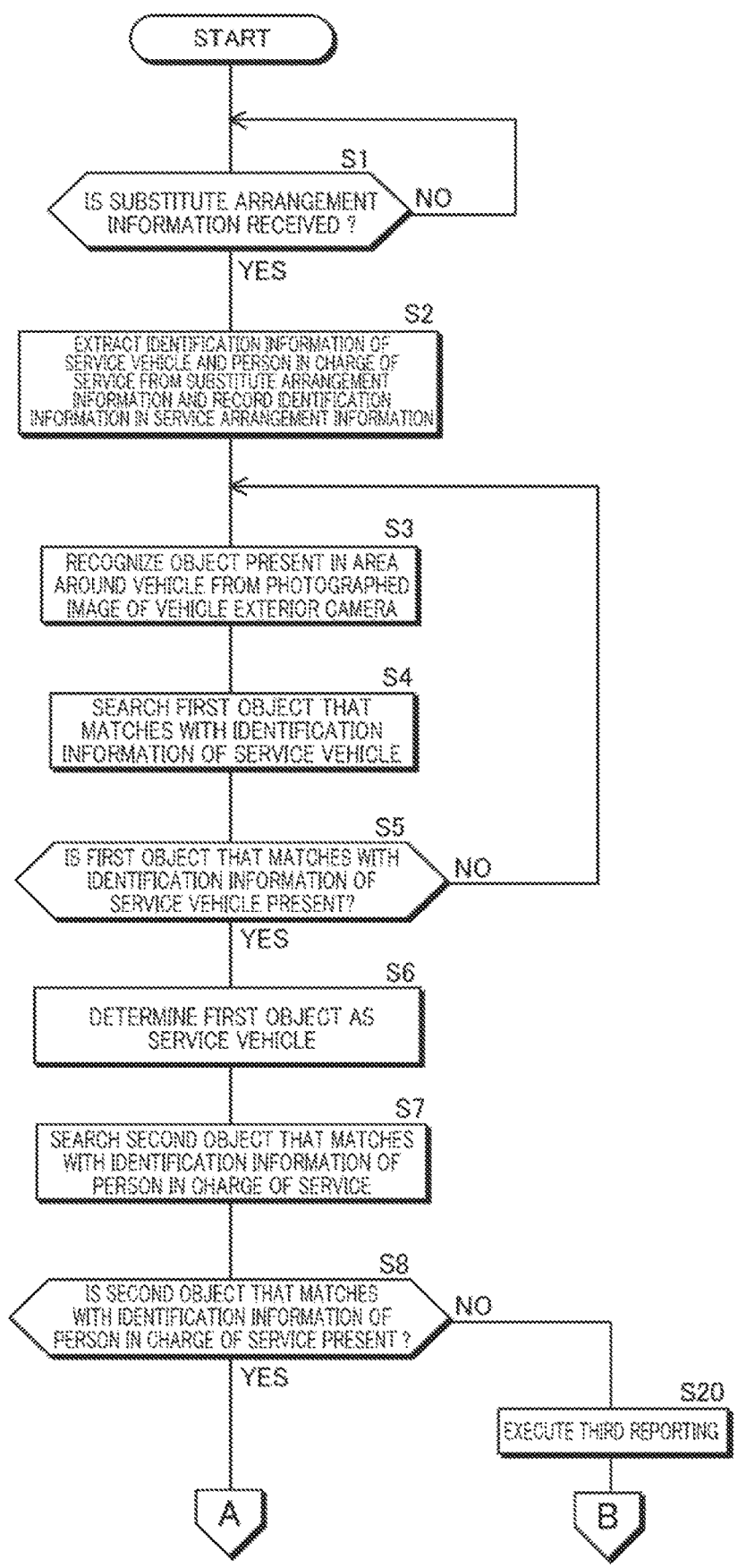
FIG. 4 is a first flowchart of support processing of the substitute driving service.

In step S1 in FIG. 4, when the substitute arrangement information Ari is received from the vehicle service server 300, the service arrangement information acquisition unit 11 advances the processing to step S2. In step S2, the service arrangement information acquisition unit 11 extracts the identification information of the service vehicle 410 and the identification information of the persons C1 and C2 in charge of the service from the substitute arrangement information Ari, and records the identification information in the service arrangement information 21 in the memory 20.

In following step S3, the surrounding object recognition unit 12 recognizes the objects present near the predetermined vehicle 1 from the images of the surroundings of the predetermined vehicle 1 photographed by the front camera 30, the right side camera 40, the left side camera 50 and the rear camera 60. In next step S4, the object authentication unit 13 searches the first object that matches with the identification information of the service vehicle 410 for the objects recognized by the surrounding object recognition unit 12.

In following step S5, the object authentication unit 13 advances the processing to step S6 when the first object that matches with the identification information of the service vehicle 410 is present, and advances the processing to step S3 when the first object that matches with the identification information of the service vehicle 410 is not present. In step S6, the object authentication unit 13 determines the first object as the service vehicle 410.

In next step S7, the object authentication unit 13 searches the second object that matches with the identification information of the person C1 or C2 in charge of the service for the objects recognized by the surrounding object recognition unit 12. In following step S8, the object authentication unit 13 advances the processing to step S9 in FIG. 5 when the second object that matches with the identification information of the person C1 or C2 in charge of the service is present, and advances the processing to step S20 when the second object that matches with the person C1 or C2 in charge of the service is not present.

In step S20, the service reception handling unit 15 executes third reporting of reporting that the persons C1 and C2 in charge of the service cannot be recognized, and calls attention of the user U. The service reception handling unit 15 performs the third reporting by displaying an attention calling screen on the touch panel 31 and outputting attention calling sound from the speaker 32. The service reception handling unit 15 continuously performs the third reporting until predetermined time of about 5 to 10 seconds for example elapses. Then, the service reception handling unit 15 advances the processing from step S20 to step S15 in FIG. 5. In addition, in step S9, the object authentication unit 13 determines the second object as the person C1 or C2 in charge of the service.

Figure 5:
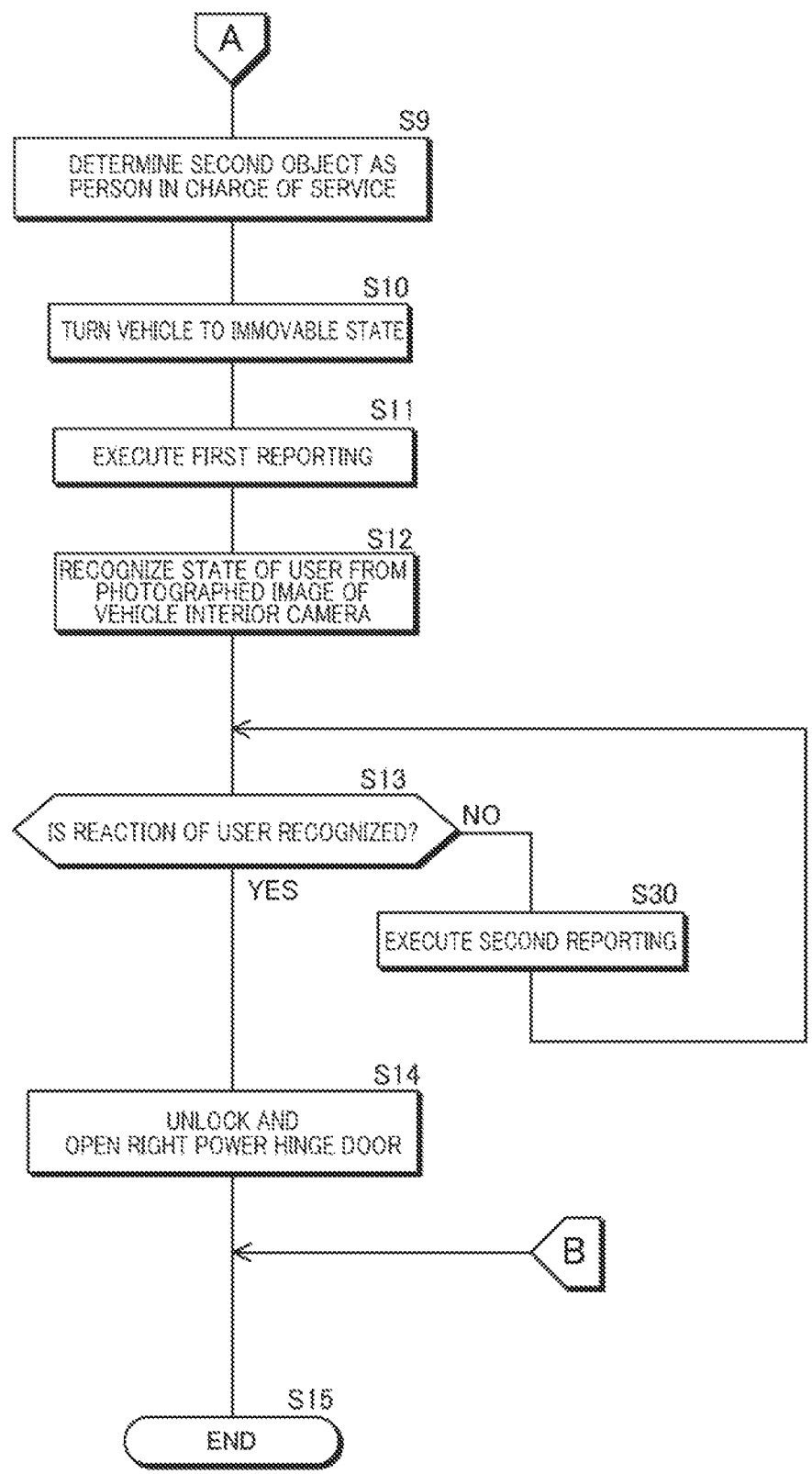
FIG. 5 is a second flowchart of the support processing of the substitute driving service.

In the case where the object (corresponding to the first object of the present invention) that matches with the identification information of the service vehicle 410 is recognized and the object (corresponding to the second object of the present invention) that matches with the identification information of the person C1 or C2 in charge of the service is recognized by the processing of steps S3-S9, the processing of step S10 in FIG. 5 and thereafter is executed. In addition, in the case where only the object (corresponding to a third object of the present invention) that matches with the identification information of the service vehicle 410 is recognized and the object (corresponding to a fourth object of the present invention) that matches with the identification information of the person C1 or C2 in charge of the service is not recognized, the processing of step S10 in FIG. 5 and thereafter is prohibited.

In step S10 in FIG. 5, the service reception handling unit 15 executes the processing of turning the predetermined vehicle 1 to the immovable state. The service reception handling unit 15 executes the processing of disabling an on operation of the power switch 72, prohibiting activation of a drive source (such as an engine or an electric motor) or the like for example, as the processing of turning the predetermined vehicle 1 to the immovable state.

In next step S11, the service reception handling unit 15 executes first reporting to the vehicle interior of the predetermined vehicle 1 by displaying a service vehicle arrival notification screen to the touch panel 31 and outputting arrival notification sound from the speaker 32. In following step S12, the user state recognition unit 14 recognizes the state of the user U from the image inside the vehicle interior of the predetermined vehicle 1, which is photographed by the front seat camera 70 or the rear seat camera 71.

In following step S13, the service reception handling unit 15 determines whether or not it is recognized that the user U has reacted (made a motion according to the first reporting) by the user state recognition unit 14. Then, the service reception handling unit 15 advances the processing to step S14 when reaction of the user U is recognized, and advances the processing to step S30 when the reaction of the user U is not recognized.

In step S30, the service reception handling unit 15 executes second reporting of outputting voice guidance similar to the first reporting from the speaker 32 with a sound volume higher than the first reporting, and advances the processing to step S11. Thus, the second reporting is repeatedly executed by the service reception handling unit 15 in step S30 until the reaction of the user U is recognized by the user state recognition unit 14 in step S13.

Note that, in the second reporting, alarm sound may be outputted together with the voice guidance. Further, in the case where the seat of the predetermined vehicle 1 is equipped with a vibrator, the vibrator may be also operated. By performing the processing, an effect of awakening the user U by the second reporting when the user U is sleeping can be increased.

In step S14, the service reception handling unit 15 unlocks the door lock mechanism 100*a* of the right power hinge door 2 (the door for the driver's seat 7*a*) of the predetermined vehicle 1 to unlock the right power hinge door 2, and opens the right power hinge door 2 by the right PHD drive unit 41. By the processing of steps S8-S14, the predetermined vehicle 1 is maintained in the stop state, the user U is made to recognize the arrival of the service vehicle 410, the state that the right power hinge door 2 for the driver's seat 7*a* is open is attained, and thus smooth execution of the substitute driving service by the persons C1 and C2 in charge of the service who have arrived can be supported.

5. Other Embodiments

In the embodiment described above, the substitute driving service is illustrated as a predetermined service that targets the predetermined vehicle 1, however, the present invention is also applicable to other predetermined services that target the predetermined vehicle. As the other predetermined services, targets are delivery of articles to the predetermined vehicle, washing of the predetermined vehicle, and charging in the case where the predetermined vehicle is an electrically driven vehicle or the like, for example. In addition, in the embodiment described above, the persons C1 and C2 in charge of the service use the service vehicle 410, however, the present invention is also applicable in the case where the person in charge of the service goes to a parking place of the predetermined vehicle on foot without using the service vehicle and performs the predetermined service that targets the predetermined vehicle.

In the embodiment described above, in step S12 in FIG. 5, the service reception handling unit 15 unlocks and opens only the right power hinge door 2 (the door for the driver's seat), however, only unlocking may be performed. In addition, the other power doors may be also unlocked or opened. Further, for the predetermined service of delivering articles to the predetermined vehicle, rear seats (the right power slide door 4 and the left power slide door 5 in the example in FIG. 2) or a tail gate (the power tail gate 6 in the example in FIG. 2) may be unlocked or opened, and a power window of the door may be opened.

In the embodiment described above, the surrounding object recognition unit 12 recognizes the object present in an area around the predetermined vehicle 1 based on the photographed images of the front camera 30, the right side camera 40, the left side camera 50 and the rear camera 60 provided on the predetermined vehicle 1. As another embodiment, the surrounding object recognition unit 12 may recognize the object such as a vehicle provided with a communication terminal or a person carrying the communication terminal by performing short-distance wireless communication with the communication terminal present near the predetermined vehicle 1.

In this case, the substitute arrangement information Ari includes an identification code of the service vehicle 410 which is the identification information of the service vehicle 410, and an identification code of the persons C1 and C2 in charge of the service which is the identification information of the persons C1 and C2 in charge of the service. Then, the object authentication unit 13 determines the object transmitting information including the identification code of the service vehicle 410 as the object that matches with the identification information of the service vehicle 410. In addition, the object authentication unit 13 determines the object transmitting the information including the identification code of the person C1 in charge of the service as the object that matches with the identification information of the person C1 in charge of the service, and determines the object transmitting the information including the identification code of the person C2 in charge of the service as the object that matches with the identification information of the person C2 in charge of the service.

In the embodiment described above, the vehicle control system of the present invention is configured by the ECU 9 loaded on the predetermined vehicle 1. As another embodiment, the vehicle control system may be configured by the vehicle control server 310 illustrated in FIG. 1. In this case, from the predetermined vehicle 1 to the vehicle control server 310, the photographed images of vehicle exterior cameras (the front camera 30, the right side camera 40, the left side camera 50 and the rear camera 60) and vehicle interior cameras (the front seat camera 70 and the rear seat camera 71) are transmitted. In addition, from the vehicle service server 300 to the vehicle control server 310, the substitute arrangement information Ari is transmitted. Then, from the vehicle control server 310 to the predetermined vehicle 1, control information for executing the predetermined processing for receiving the predetermined service is transmitted.

Further, a part of the configuration of the vehicle control system may be configured by the ECU 9 of the predetermined vehicle 1, and the remaining configuration of the vehicle control system may be configured by the vehicle control server 310. For example, it is possible to have an aspect of configuring the surrounding object recognition unit 12 and the user state recognition unit 14 by the ECU 9 and configuring the service arrangement information acquisition unit 11 and the service reception handling unit 15 by the vehicle control server. In this case, the vehicle control system is configured by the ECU 9 and the vehicle control server 310.

In addition, the vehicle control system of the present invention may be configured by an application of the user terminal 200. In this case, the vehicle control method of the present invention is executed by a CPU (not illustrated) of the user terminal 200, the photographed images of the vehicle exterior cameras and the vehicle interior cameras are transmitted from the predetermined vehicle 1 to the user terminal 200, and the substitute arrangement information Ari is transmitted from the vehicle service server 300 to the user terminal 200. Then, the control information for executing the predetermined processing for receiving the predetermined service is transmitted from the user terminal 200 to the predetermined vehicle 1.

Further, a part of the configuration of the vehicle control system may be configured by the application of the user terminal 200, and the remaining configuration of the vehicle control system may be configured by the ECU 9 or the vehicle control server 310. In this case, the vehicle control system is configured by the user terminal 200 and the ECU 9, or by the user terminal 200, the ECU 9 and the vehicle control server 310.

In the embodiment described above, the service reception handling unit 15 executes the processing (the processing for receiving the predetermined service) of step S10 in FIG. 5 and thereafter, when it is determined by the object authentication unit 13 that the first object that matches with the identification information of the service vehicle 410 and the second object that matches with the identification information of the person C1 or C2 in charge of the service are present by the processing of steps S3-S9 in FIG. 4. As another embodiment, the processing for receiving the predetermined service may be executed also in the case where it is determined by the object authentication unit 13 that only either one of the first object that matches with the identification information of the service vehicle 410 and the second object that matches with the identification information of the person C1 or C2 in charge of the service is present.

In the embodiment described above, the service reception handling unit 15 executes the processing of making the predetermined vehicle 1 immovable, reporting (the first reporting and the second reporting) to the vehicle interior of the predetermined vehicle, the processing of unlocking the door lock of the predetermined vehicle 1, and the processing of opening the power door of the predetermined vehicle 1, as the predetermined processing for receiving the predetermined service to the predetermined vehicle 1, however, not all but a part of the processing may be executed. In addition, of the first reporting and the second reporting, only the first reporting may be executed.

In the embodiment described above, the service reception handling unit 15 performs the first reporting, the second reporting and the third reporting by the touch panel 31 and the speaker 32 provided in the vehicle interior of the predetermined vehicle 1, however, the first reporting, the second reporting and the third reporting may be performed by a display device and a speaker (not illustrated) provided in the user terminal 200. In this case, the service reception handling unit 15 transmits the control information that instructs the execution of the first reporting, the second reporting and the third reporting to the user terminal 200.

Note that FIGS. 1 to 3 are schematic diagrams illustrating the configuration of the predetermined vehicle 1 and the ECU 9 including the function of the vehicle control system in divisions depending on main processing content to facilitate understanding of the present invention, but the configuration of the predetermined vehicle 1 and the vehicle control system may be configured by other divisions. In addition, the processing of each component may be executed by one hardware unit, or may be executed by a plurality of hardware units. Further, the processing by each component illustrated in FIGS. 4 to 5 may be executed by one program, or may be executed by a plurality of programs.

6. Configuration Supported by Embodiment Described Above

The embodiment described above is a specific example of the configuration below.

(Clause 1) A vehicle control system including: a service arrangement information acquisition unit configured to acquire service arrangement information including identification information of at least either one of a person in charge of a service who executes a predetermined service that targets a predetermined vehicle and a service vehicle used when executing the predetermined service; a surrounding object recognition unit configured to recognize an object located in an area around the predetermined vehicle; an object authentication unit configured to determine whether or not the object is the person in charge of the service or the service vehicle based on the identification information; and a service reception handling unit configured to execute predetermined processing for receiving the predetermined service in a case where the object is determined as the person in charge of the service or the service vehicle by the object authentication unit.

According to the vehicle control system of Clause 1, in the case where the object located in an area around the predetermined vehicle which is a target of the predetermined service is determined as the person in charge of the service or the service vehicle the identification information of which is included in the service arrangement information by the object authentication unit, the predetermined processing for receiving the predetermined service is executed by the service reception handling unit. Thus, the efficient execution of the service that targets the vehicle can be supported.

(Clause 2) The vehicle control system according to Clause 1, wherein the surrounding object recognition unit recognizes the object by extracting an image portion satisfying a predetermined extraction condition from a surrounding image of the predetermined vehicle photographed by a camera provided on the predetermined vehicle, the identification information is an image of the person in charge of the service or the service vehicle, and the object authentication unit determines whether or not the object is the person in charge of the service or the service vehicle based on a matching degree between the image portion and the image of the person in charge of the service or the service vehicle.

According to the vehicle control system of Clause 2, by recognizing the object present in an area around the predetermined vehicle based on the photographed image of the camera, it is more surely recognized that the person in charge of the service or the service vehicle has approached the predetermined vehicle, and the predetermined processing for receiving the predetermined service can be executed.

(Clause 3) The vehicle control system according to Clause 1 or Clause 2, wherein the service reception handling unit executes first reporting to a user of the predetermined vehicle as the predetermined processing.

According to the vehicle control system of Clause 3, by reporting the arrival of the person in charge of the service or the service vehicle to the user riding on the predetermined vehicle by the first reporting, the user can be urged to prepare to receive the predetermined service.

(Clause 4) The vehicle control system according to Clause 3, including a user state recognition unit configured to recognize a state of the user riding on the predetermined vehicle, wherein the service reception handling unit executes second reporting different from the first reporting to the user in the case where reaction of the user according to the first reporting is not recognized by the user state recognition unit.

According to the vehicle control system of Clause 4, for example, in the case where the user is sleeping and the user does not react even when the first reporting is performed, by performing the second reporting different from the first reporting, the user can be urged to awake and turned to the state capable of receiving the predetermined service.

(Clause 5) The vehicle control system according to any one of Clauses 1 to 4, wherein the service arrangement information includes identification information of the person in charge of the service and the service vehicle, and the service reception handling unit executes processing of unlocking a door lock of the predetermined vehicle as the predetermined processing in the case where a first object is determined as the service vehicle and a second object is determined as the person in charge of the service by the object authentication unit.

According to the vehicle control system of Clause 5, in the case where the object determined as the service vehicle by the object authentication unit and the object determined as the person in charge of the service by the object authentication unit are present, the door lock of the predetermined vehicle is unlocked. Thus, unlocking of the door lock of the predetermined vehicle by erroneous recognition of the person in charge of the service or the service vehicle can be suppressed.

(Clause 6) The vehicle control system according to any one of Clauses 1 to 5, wherein the service arrangement information includes identification information of the person in charge of the service and the service vehicle, and the service reception handling unit executes third reporting to a user of the predetermined vehicle in the case where a third object is determined as the service vehicle by the object authentication unit and a fourth object determined as the person in charge of the service by the object authentication unit is not located.

According to the vehicle control system of Clause 6, in the case where the object determined as the service vehicle by the object authentication unit is located but the object determined as the person in charge of the service is not located, the user of the predetermined vehicle can be urged to pay attention by the third reporting.

(Clause 7) The vehicle control system according to any one of Clauses 1 to 6, wherein the service reception handling unit executes processing of turning the predetermined vehicle to an immovable state as the predetermined processing.

According to the vehicle control system of Clause 7, by turning the predetermined vehicle to the immovable state and making the predetermined vehicle stay at a parked position, the state where the person in charge of the service who has arrived can surely execute the predetermined service to the predetermined vehicle can be attained.

(Clause 8) The vehicle control system according to any one of Clauses 1 to 7, wherein the service reception handling unit executes processing of opening a power door provided in the predetermined vehicle as the predetermined processing.

According to the vehicle control system of Clause 8, riding on the predetermined vehicle and carrying in of delivery by the person in charge of the service are made possible, and the execution of the predetermined service can be supported.

(Clause 9) A vehicle control method executed by a computer, the method including: a service arrangement information acquisition step of acquiring service arrangement information including identification information of at least either one of a person in charge of a service who executes a predetermined service that targets a predetermined vehicle and a service vehicle used when executing the predetermined service; a surrounding object recognition step of recognizing an object located in an area around the predetermined vehicle; an object authentication step of determining whether or not the object is the person in charge of the service or the service vehicle based on the identification information; and a service reception handling step of executing predetermined processing for receiving the predetermined service in a case where the object is determined as the person in charge of the service or the service vehicle by the object authentication step.

By executing the vehicle control method of Clause 9 by the computer, effects similar to the vehicle control system of Clause 1 can be obtained.

(Clause 10) A non-transitory computer-readable storage medium storing a control program which is executed by a processor of a vehicle control system to control a vehicle, wherein the control program makes the processor functions as: a service arrangement information acquisition unit configured to acquire service arrangement information including identification information of at least either one of a person in charge of a service who executes a predetermined service that targets a predetermined vehicle and a service vehicle used when executing the predetermined service; a surrounding object recognition unit configured to recognize an object located in an area around the predetermined vehicle; an object authentication unit configured to determine whether or not the object is the person in charge of the service or the service vehicle based on the identification information; and a service reception handling unit configured to execute predetermined processing for receiving the predetermined service in a case where the object is determined as the person in charge of the service or the service vehicle by the object authentication unit.

By executing the vehicle control program of Clause 10 as a function of the processor by the computer, the configuration of the vehicle control system of Clause 1 can be achieved.

REFERENCE SIGNS LIST

1 . . . predetermined vehicle, 2 . . . right power hinge door, 3 . . . left power hinge door, 4 . . . right power slide door, 5 . . . left power slide door, 6 . . . power tail gate, 9 . . . ECU (vehicle control system), 10 . . . CPU, 11 . . . service arrangement information acquisition unit, 12 . . . surrounding object recognition unit, 13 . . . object authentication unit, 14 . . . user state recognition unit, 15 . . . service reception handling unit, 20 . . . memory, 21 . . . service arrangement information, 22 . . . vehicle control program, 30 . . . front camera, 31 . . . touch panel, 32 . . . speaker, 40 . . . right side camera, 50 . . . left side camera, 60 . . . rear camera, 70 . . . front seat camera, 71 . . . rear seat camera, 300 . . . vehicle service server, 310 . . . vehicle control server, 400 . . . vehicle service provider, 410 . . . service vehicle, 600 . . . communication network, U . . . user, C1,C2 . . . person in charge of service.

What is claimed is:

1. A vehicle control system comprising:
   a service arrangement information acquisition unit configured to acquire service arrangement information including identification information of at least either one of a person in charge of a service who executes a predetermined service that targets a predetermined vehicle and a service vehicle used when executing the predetermined service;
   a surrounding object recognition unit configured to recognize an object located in an area around the predetermined vehicle;
   an object authentication unit configured to determine whether or not the object is the person in charge of the service or the service vehicle based on the identification information; and
   a service reception handling unit configured to execute predetermined processing for receiving the predetermined service in a case where the object is determined as the person in charge of the service or the service vehicle by the object authentication unit.

2. The vehicle control system according to claim 1, wherein
the surrounding object recognition unit recognizes the object by extracting an image portion satisfying a predetermined extraction condition from a surrounding image of the predetermined vehicle photographed by a camera provided on the predetermined vehicle,
the identification information is an image of the person in charge of the service or the service vehicle, and
the object authentication unit determines whether or not the object is the person in charge of the service or the service vehicle based on a matching degree between the image portion and the image of the person in charge of the service or the service vehicle.

3. The vehicle control system according to claim 1, wherein the service reception handling unit executes first reporting to a user of the predetermined vehicle as the predetermined processing.

4. The vehicle control system according to claim 3, comprising
a user state recognition unit configured to recognize a state of the user riding on the predetermined vehicle,
wherein the service reception handling unit executes second reporting different from the first reporting to the user in the case where reaction of the user according to the first reporting is not recognized by the user state recognition unit.

5. The vehicle control system according to claim 1, wherein
the service arrangement information includes identification information of the person in charge of the service and the service vehicle, and
the service reception handling unit executes processing of unlocking a door lock of the predetermined vehicle as the predetermined processing in the case where a first object is determined as the service vehicle and a second object is determined as the person in charge of the service by the object authentication unit.

6. The vehicle control system according to claim 1, wherein
the service arrangement information includes identification information of the person in charge of the service and the service vehicle, and
the service reception handling unit executes third reporting to a user of the predetermined vehicle in the case where a third object is determined as the service vehicle by the object authentication unit and a fourth object determined as the person in charge of the service by the object authentication unit is not located.

7. The vehicle control system according to claim 1, wherein the service reception handling unit executes processing of turning the predetermined vehicle to an immovable state as the predetermined processing.

8. The vehicle control system according to claim 1, wherein the service reception handling unit executes processing of opening a power door provided in the predetermined vehicle as the predetermined processing.

9. A vehicle control method executed by a computer, the method comprising:
a service arrangement information acquisition step of acquiring service arrangement information including identification information of at least either one of a person in charge of a service who executes a predetermined service that targets a predetermined vehicle and a service vehicle used when executing the predetermined service;
a surrounding object recognition step of recognizing an object located in an area around the predetermined vehicle;
an object authentication step of determining whether or not the object is the person in charge of the service or the service vehicle based on the identification information; and
a service reception handling step of executing predetermined processing for receiving the predetermined service in a case where the object is determined as the person in charge of the service or the service vehicle by the object authentication step.

10. A non-transitory computer-readable storage medium storing a control program which is executed by a processor of a vehicle control system to control a vehicle, wherein the control program makes the processor functions as:
a service arrangement information acquisition unit configured to acquire service arrangement information including identification information of at least either one of a person in charge of a service who executes a predetermined service that targets a predetermined vehicle and a service vehicle used when executing the predetermined service;
a surrounding object recognition unit configured to recognize an object located in an area around the predetermined vehicle;
an object authentication unit configured to determine whether or not the object is the person in charge of the service or the service vehicle based on the identification information; and
a service reception handling unit configured to execute predetermined processing for receiving the predetermined service in a case where the object is determined as the person in charge of the service or the service vehicle by the object authentication unit.

* * * * *